United States Patent
Chen et al.

(10) Patent No.: US 10,901,979 B2
(45) Date of Patent: Jan. 26, 2021

(54) GENERATING RESPONSES TO QUERIES BASED ON SELECTED VALUE ASSIGNMENTS

(71) Applicant: International Business Machines Corporation, Armonk, NY (US)

(72) Inventors: Lior Chen, Ashdod (IL); Meir Kalech, Modi'in (IL); Dennis Potashnik, Omer (IL); Ron Zvi Stern, Modi'in (IL)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 16/115,622

(22) Filed: Aug. 29, 2018

(65) Prior Publication Data
US 2020/0073975 A1  Mar. 5, 2020

(51) Int. Cl.
*G06F 16/00* (2019.01)
*G06F 16/23* (2019.01)
*G06F 16/2457* (2019.01)

(52) U.S. Cl.
CPC .... *G06F 16/2365* (2019.01); *G06F 16/24578* (2019.01)

(58) Field of Classification Search
CPC ............. G06F 16/2462; G06F 16/2365; G06F 16/2478; G06F 16/215
See application file for complete search history.

(56) References Cited

U.S. PATENT DOCUMENTS

| | | | | |
|---|---|---|---|---|
| 6,782,377 | B2 * | 8/2004 | Agarwal | G06F 16/353 706/47 |
| 6,789,070 | B1 * | 9/2004 | Willett | G06K 9/6261 706/19 |
| 8,135,701 | B2 * | 3/2012 | Kutsch | G06F 16/24545 707/713 |
| 10,698,755 | B2 * | 6/2020 | Goldenberg | G06F 11/0769 |
| 2007/0214133 | A1 | 9/2007 | Liberty et al. | |
| 2008/0133434 | A1 | 6/2008 | Asar et al. | |
| 2008/0168135 | A1 * | 7/2008 | Redlich | G06F 21/6218 709/204 |
| 2009/0089630 | A1 * | 4/2009 | Goldenberg | G06F 16/2462 714/704 |
| 2009/0158430 | A1 * | 6/2009 | Borders | H04L 63/1408 726/23 |
| 2010/0010968 | A1 * | 1/2010 | Redlich | G06Q 10/00 707/E17.014 |

(Continued)

OTHER PUBLICATIONS

Noor M.N. et al., "Filling missing data using interpolation methods: study on the effect of fitting distribution", Key Engineering Materials vols. 594-595 (2014) pp. 889-895.

*Primary Examiner* — Leslie Wong
(74) *Attorney, Agent, or Firm* — Barry D. Blount (57) ABSTRACT

In an example computer-implemented method, a dataset and a query including an expression to be matched to the dataset is received via a processor. A false positive rate (FPR) and a false negative rate (FNR) is calculated via the processor for each possible value assignment of a plurality of possible value assignments in response to detecting a missing value in the dataset. A value assignment is selected, via the processor, from the plurality of possible value assignments based on the FPR and the FNR. A response to the query is generated via the processor based on the selected value assignment.

18 Claims, 8 Drawing Sheets

(56) References Cited

U.S. PATENT DOCUMENTS

| | | | |
|---|---|---|---|
| 2013/0276114 A1* | 10/2013 | Friedrichs | G06F 21/567 726/23 |
| 2014/0324752 A1* | 10/2014 | Statnikov | G06F 17/18 706/46 |
| 2015/0347753 A1* | 12/2015 | Tuvell | G06F 21/566 726/24 |
| 2015/0381649 A1* | 12/2015 | Schultz | G06Q 40/08 726/25 |
| 2016/0027278 A1* | 1/2016 | McIntosh | G08B 21/0423 715/741 |
| 2016/0103838 A1* | 4/2016 | Sainani | H04L 41/5012 707/725 |
| 2018/0060738 A1* | 3/2018 | Achin | G06Q 10/04 |
| 2018/0081914 A1 | 3/2018 | Zoll et al. | |
| 2020/0057782 A1* | 2/2020 | Idreos | G06F 16/2246 |
| 2020/0193145 A1* | 6/2020 | Trani | G06K 9/00288 |

\* cited by examiner

GENERATING RESPONSES TO QUERIES BASED ON SELECTED VALUE ASSIGNMENTS

BACKGROUND

The present techniques relate to querying data with missing values. More specifically, the techniques relate to generating responses to queries using a dataset with missing values or matching a patterns to data with missing values.

SUMMARY

According to an embodiment described herein, a system can include a processor to receive a dataset and a query comprising an expression to be matched to the dataset. The processor can also further calculate a false positive rate (FPR) and a false negative rate (FNR) for each possible value assignment of a plurality of possible value assignments in response to detecting a missing value in the dataset. The processor can also select a value assignment from the plurality of possible value assignments based on the FPR and the FNR. The processor can further generate a response to the query based on the selected value assignment.

According to another embodiment described herein, a method can include receiving, via a processor, a dataset and a query comprising an expression to be matched to the dataset. The method can further include calculating, via the processor, a false positive rate (FPR) and a false negative rate (FNR) for each possible value assignment of a plurality of possible value assignments in response to detecting a missing value in the dataset. The method can also further include selecting, via the processor, a value assignment from the plurality of possible value assignments based on the FPR and the FNR. The method can also include generating, via the processor, a response to the query based on the selected value assignment.

According to another embodiment described herein, a computer program product can include computer-readable storage medium having program code embodied therewith. The computer readable storage medium is not a transitory signal per se. The program code executable by a processor to cause the processor to receive a dataset and a query comprising an expression to be matched to the dataset The program code can also cause the processor to calculate a false positive rate (FPR) and a false negative rate (FNR) for each possible value assignment of a plurality of possible value assignments in response to detecting a missing value in the dataset. The program code can also cause the processor to select a value assignment from the plurality of possible value assignments based on the FPR and the FNR. The program code can also cause the processor to generate a response to the query based on the selected value assignment.

DETAILED DESCRIPTION

A number of systems are designed to monitor an incoming stream of events, aiming to detect events of interest. For example, events of interest may include malicious events. Network Intrusion Detection Systems (NIDS), Security and Information Event Management (SIEM) systems, spam filters, and antivirus software are examples of systems that can monitor an incoming sequence of events and detect abnormal or malicious activities. A common architecture for such systems is to define rules over various properties of the incoming events, and an event that matches one or more of these rules is regarded as abnormal. For example, incoming events can be checked against this set of rules, and every event that matches one or more of these rules can be returned. However, the event collection process in such systems is often noisy, and may include events with missing fields. In addition, some fields of the incoming events may be filtered out due to privacy or volume-reducing considerations, and thus will not be available for inspection. Consequently, having events with missing fields is common. Moreover, simply choosing the most probable values for the missing fields may not necessarily lead to the best solution for at least two reasons. First, computing the most probable values for the missing values ignores the structure of the rules used to identify the events of interest. Second, each choice of missing values may introduce two forms of error: incorrectly identifying a normal event as one of interest, referred to herein as a producing a false positive, and incorrectly classifying an event of interest as a normal event, which is referred to herein as producing a false negative. Different choices of values to set to the missing fields may produce different false positives and false negatives, but the importance of each type of error can depend on the exact application. For example, if the events of interest are passed to a human operator, then the system may be set to keep the false positives low; otherwise, the human operator may be overwhelmed with irrelevant events.

According to embodiments of the present disclosure, a processor can receive a dataset and a query comprising an expression to be matched to the dataset. In response to detecting a missing value in the dataset, the processor can calculate a false positive rate (FPR) and a false negative rate (FNR) for each possible value assignment of a plurality of possible value assignments. For example, the possible value assignments may be a combination of TRUE or FALSE values for each condition or pattern related to missing values. The processor can select a value assignment from the possible value assignments based on the FPR and the FNR. The processor can then generate a response to the query based on the selected value assignment. Thus, embodiments of the present disclosure allow missing values to be selected and used to generate responses to queries. The techniques may thus be used to determine whether some data record fits a defined logical expression when some of the values of the data record are unknown (missing) and are referenced by the pattern. The techniques further provide more accurate pattern matching with missing values than simply choosing most probable values for the missing values.

As discussed in more detail below in reference to at least FIGS. 5-7, a computing device configured to generate responses to queries based on datasets with missing values may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
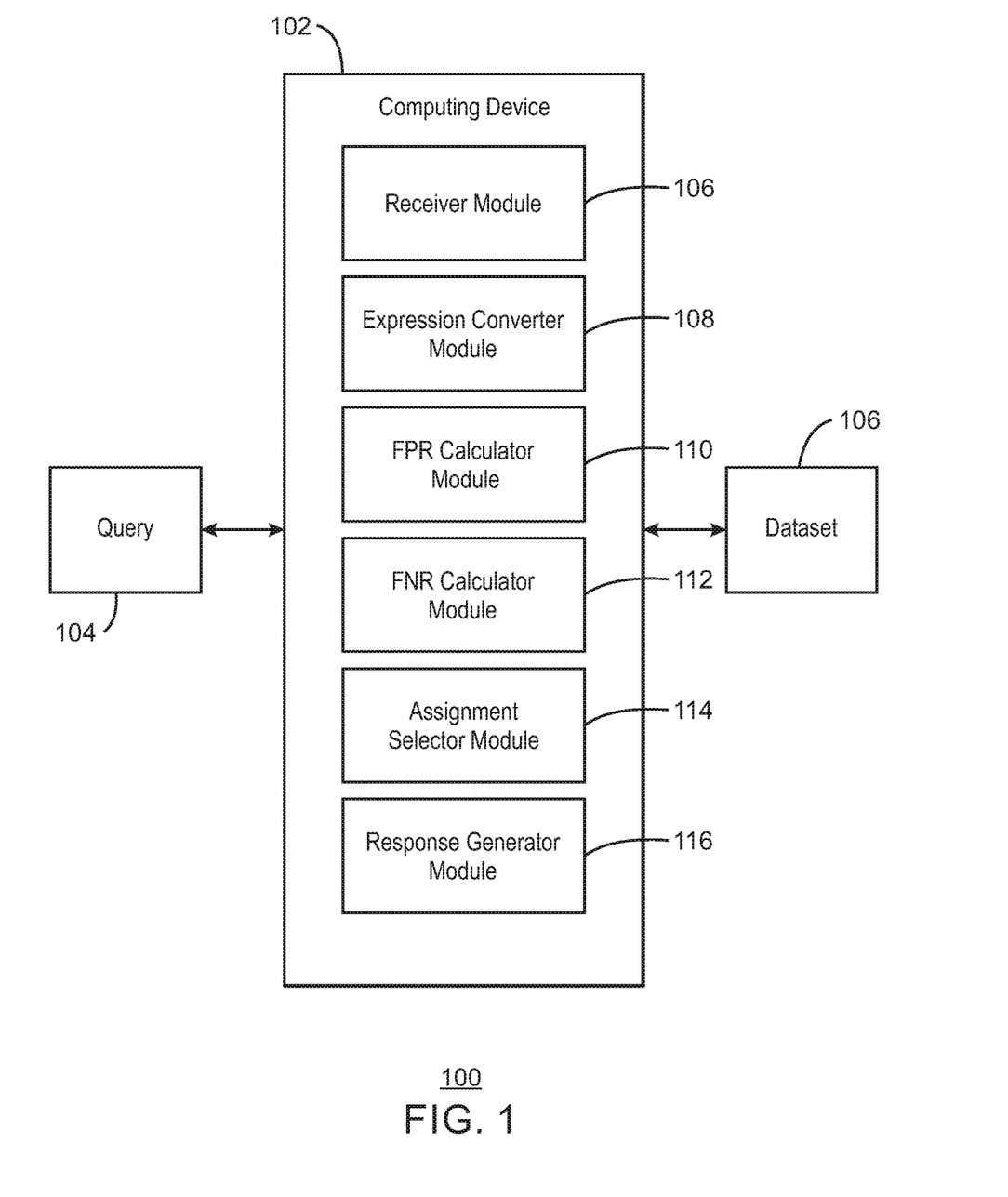
FIG. 1 is a block diagram of an example system for generating responses to queries based on datasets with missing values.

With reference now to FIG. 1, a block diagram shows an example system for generating responses to queries based on datasets with missing values. The example system is generally referred to by the reference number 100. The system 100 of FIG. 1 includes a computing device 102. The computing device is shown receiving a query 104 and is communicatively coupled to a dataset 106. For example, the dataset may be information collected by an event monitor (not shown). The computing device 102 includes a receiver module 106, an expression converter module 108, a false positive rate (FPR) calculator module 110, a false negative rate (FNR) calculator module 112, an assignment selector module 114, and a response generator module 116.

In the example of FIG. 1, the computing device 102 may be used to generate responses to queries with respect to the dataset 106. For example, the dataset 106 may be events collected by an event collector. The events may include one or more missing values. For example, the missing values may have been filtered out due to privacy or volume-reducing considerations. For example, given a database table in the dataset 106 with fields "FirstName, LastName, id, address", the computing device 102 can determine whether some event matches a pattern provided in a query of "FirstName='John' AND LastName='Black' AND id='0000001'," where the field "LastName" may be missing in some events of the database table in the dataset 106. In some examples, the query may be whether or not the dataset includes any malicious events as determined via matching one or more predefined rules.

Still referring to FIG. 1, in order to determine whether the pattern matches a particular record with a missing field value, the computing device 102 can estimate false positive rate and the false negative rate for each of the records with missing values. For example, the computing device 102 can estimate the error in case of "LastName='Black'" is True and "LastName='Black'" is False, for each of the events missing the field value for the field "LastName." In order to estimate the error, the computing device 102 can calculate the probability of literals or conjunction of literals to be true or false. As used herein, a literal refers an element in a clause of Q that is a condition over a field. In some examples, every element in a clause Q may be a condition over some field. For example, receiver module 106 may receive the query 104 including an expression and a plurality of events from the dataset 106. The expression may be a Boolean expression including a plurality of literals corresponding to the pattern to be matched. For example, the three literals in the example above are: "FirstName='John'" "LastName='Black'" and "id='0000001'." In some examples, the expression converter 108 can convert the received expression to a normalized form. For example, the normalized form can be a conjunctive normal form (CNF) expression. A CNF expression as used herein refers to a conjunction of one or more clauses, where a clause is a disjunction of literals.

The computing device 102 can then calculate a false positive rate (FPR) and a false negative rate (FNR) for each of the possible value assignments for the missing values. For example, the FPR calculator module 110 can calculate the FPR for each possible value assignment of missing values on the CNF expression generated by the expression converter module 108. In some examples, the FPR calculator module 110 can calculate the false positive rate FPR of a received query in CNF form Q with a set of missing literals L assigned according to an assignment $\phi$ based on a probability function Pr for estimating the likelihood of an assignment using the following algorithm:

---
Algorithm 1: Calculating False Positive Rate (FPR)
---
1. A ← True
2. B ← True
3. D ← True
4. For each clause cl ∈ Q
5.  $T_{cl}$ ← {l||l∈cl ∧ l∈L ∧ $\phi$(l) = True}
6.  $F_{cl}$ ← {l||l∈cl ∧ l∈L ∧ $\phi$(l) = False}
7.  If $T_{cl}$ = $F_{cl}$ = ∅
8.   A ← A ∧ cl
9.  Else If $T_{cl}$ ≠ ∅
10.   D ← D ∧ cl
11.  Else If $F_{cl}$ ≠ cl
12.   B ← B ∧ (cl\$F_{cl}$)
13.  else
14.   RETURN 0
15.
$$P_{Q_{FP}} \leftarrow \sum_{k=1}^{|D|} \left[ (-1)^{k-1} \sum_{\substack{D' \subseteq D \\ |D'|=k}} Pr(A \wedge B \wedge \wedge_{d \in D'} \neg d) \right]$$

16. $P_Q$ = Pr(Q)

---
Algorithm 1: Calculating False Positive Rate (FPR)
---
17. FPR ← $P_{Q_{FP}}$/(1 − $P_Q$)
18. RETURN FPR Algorithm 1 computes the FPR for a given probability function Pr, a query Q given in CNF, a set of missing literals L, and an assignment $\phi$ of values to these missing literals. The algorithm can be divided for description into two sections. In the first section, including lines 4-12, the algorithm partitions the query Q into three CNF expressions: A, B, and D. A is the CNF expression that includes all the clauses in Q that do not contain any missing literal. As used herein, a clause refers to a disjunction of literals. D is the CNF expression that includes all clauses in Q that contain at least one missing literal that is assigned to True according to $\phi$. All the remaining clauses in Q are all the clauses that contain at least one missing literal and no missing literal that is assigned true in $\phi$. For each such clause, the algorithm can remove the missing literals because such literals can be assumed to be False according to $\phi$. The CNF containing these clauses with removed literals is called B. The records returned by Q after assigning $\phi$ is therefore the records in the dataset 106 that satisfy A∧B. The false positives are those records that satisfy A∧B but do not satisfy one or more of the records in D.

The second part of Algorithm 1 (lines 13-18) computes the probability of these false positives, by checking the probability that every subset of clauses in D will return false. To this end, the Algorithm 1 uses the inclusion-exclusion principle (line 15). Eventually, the result is divided by the probability of the negatives in Q (1-P_Q), to become the false positive rate (lines 16-17). For example, assuming |D|=2, then $Q_{FP}$=A∧B∧¬(∧$D_2$)=(A∧B∧¬$D_1$)∨(A∧B∧¬$D_2$), and Pr($Q_{FP}$)=Pr(A∧B∧¬$D_1$)+Pr(A∧B∧¬$D_2$)−Pr(A∧B∧¬$D_1$∧¬$D_2$).

Similarly, the FNR calculator module 112 can calculate the FNR for each possible value assignment of missing values on the CNF expression generated by the expression converter module 108. In some examples, the FNR calculator module 112 can calculate the false negative rate FNR of a received query in CNF form Q with a set of missing literals L assigned according to an assignment $\phi$ based on a probability function Pr for estimating the likelihood of an assignment using the following algorithm:

---
Algorithm 2: Calculating False Negative Rate (FNR)
---
1. B ← True
2. For each clause cl ∈ Q
3.  $T_{cl}$ ← {l||l∈cl ∧ l∈L ∧ $\phi$(l) = True}
4.  $F_{cl}$ ← {l||l∈cl ∧ l∈L ∧ $\phi$(l) = False}
5.  If $F_{cl}$ = cl ≠ ∅
6.   RETURN 1
7.  Else If $T_{cl}$ ≠ ∅ ∧ $F_{cl}$ ≠ ∅
8.   B ← B ∧ (cl\$F_{cl}$)
9.
$$P_{Q_{FN}} \leftarrow \sum_{k=1}^{|B|} \left[ (-1)^{k-1} \sum_{\substack{B' \subseteq B \\ |B'|=k}} Pr(Q \wedge \wedge_{b \in B'} \neg b) \right]$$

10. $P_Q$ ← Pr(Q)
11. FNR ← $P_{Q_{FN}}$/$P_Q$
12. RETURN FNR

The computing device 102 can use Algorithm 2 to compute the false negative rate in a similar way to computing the false positive rate in Algorithm 1 described above. The execution of Algorithm 2 can also similarly be divided into two sections. First, the processor can generate a sets of disjunctions B. In particular, in lines 1-8, the processor can generate the set of disjunctions B used to build the expression representing the false negatives. In case an entire clause has a false assignment, the processor can set the false negative rate to a value of 1 indicating no positive results in lines 5-6. Secondly, using the probability function Pr, the processor can compute the FNR from the original query Q and the set B. In particular, the processor can calculate the probability of the expression which represents the false negatives of query Q given the assignment of the missing values, as presented in equation on line 4. Then, the processor can divide the resulting false negative probability of the expression $P_{Q_{FN}}$ by the probability of the positives in Q ($P_Q$), to generate the false negative rate FNR.

The assignment selector module 114 can then select a particular value assignment for the missing values based on the FPR and FNR for different value assignments of the values calculated above. For example, the assignment selector module 114 can select a value assignment using an objective function that is some combination of FPR and FNR. In some examples, this objective function can be defined by the user of the system and can depend on the concrete domain in which the function is deployed. As one example, the assignment selector module 114 can use an objective function that minimizes one of the FPR or FNR values. As another example, the assignment selector module 114 can use an objective function that minimizes the FNR, as long as the FNR is smaller than some predefined value. For example, the predefined value for the FNR may be 0.1. In some examples, if the number of missing fields is relatively small, the assignment selector module 114 can exhaustively check all possible value assignments for the missing fields, computing for each value assignment the objective function using the FPR and FNR values computed above. Then, the assignment selector module 114 can simply return the missing value assignment that maximizes the objective function.

The response generator module 116 can then generate a response based on the selected value assignment of missing values. For example, the response may include a set of one or more events of interest based on matching values including the missing values replaced with the assigned values. In some examples, the response may include a detected malicious event, when a malicious event matches one or more values associated with malicious events. For example, the query may be First-name="John" AND "IP=10.0.0.1" and the response can return a record with these values. In some examples, the identified events can be either automatically handled or they are displayed to a human operator that can decide how to handle them. For example, the identified events may be automatically handled by blocking traffic from an offender.

As demonstrated experimentally, the value assignment of missing values that maximizes this objective function can be more accurate than simply choosing the most probable missing values assignment. In particular, sometimes the least probable missing value assignment was found to be more accurate than the most probable missing value assignment.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional computing devices, or queries, datasets, etc.).

Figure 2:
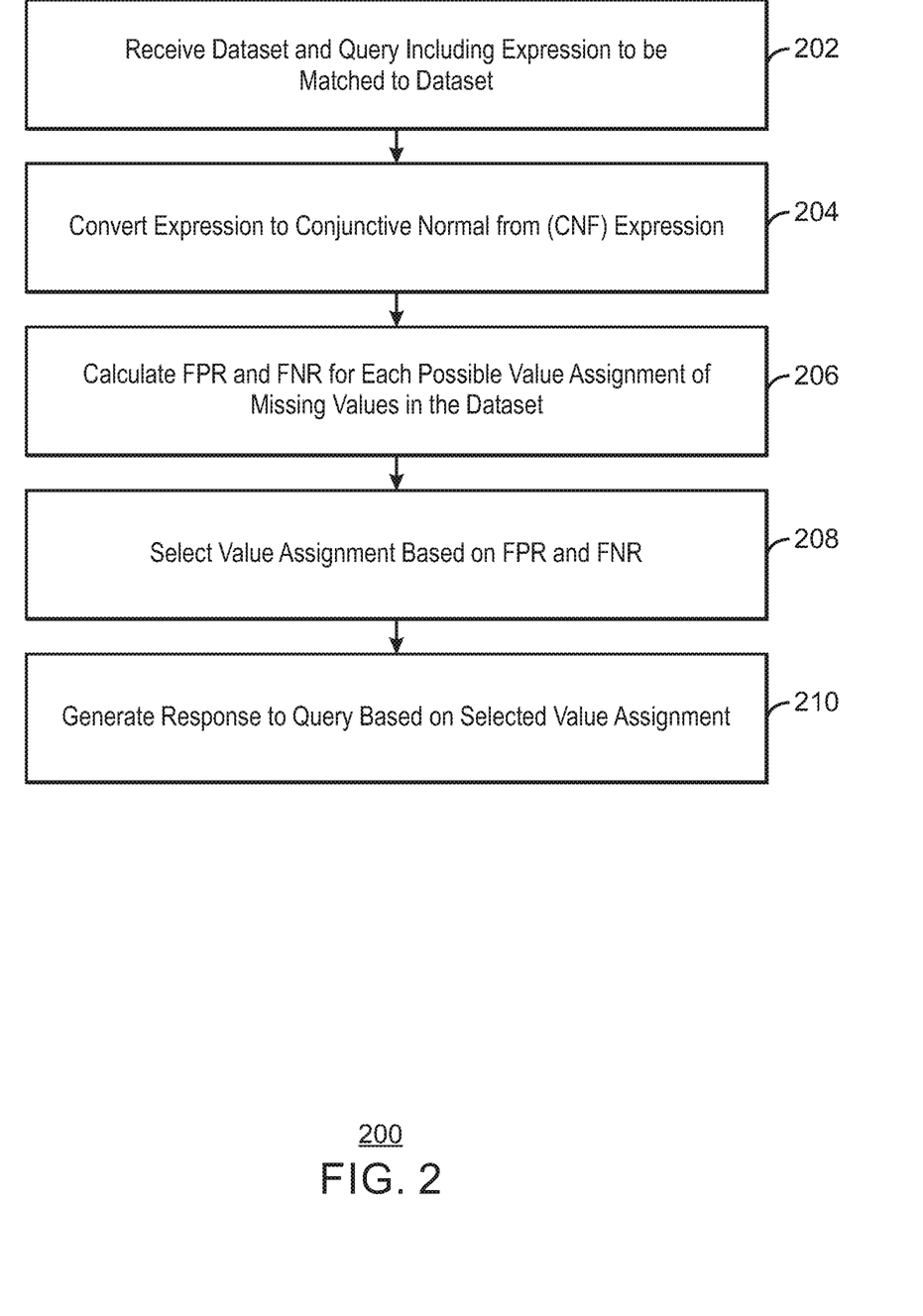
FIG. 2 is a block diagram of an example method that can generate responses to queries based on datasets with missing values.

FIG. 2 is a process flow diagram of an example method that can generate responses to queries based on datasets with missing values. The method 200 can be implemented with any suitable computing device, such as the system 100 of FIG. 1 or the computing device 500 of FIG. 5. For example, the methods described below can be implemented by the processor 502 of FIG. 5 or the processor 802 of FIG. 8.

At block 202, a processor receives a dataset and a query including an expression to be matched to the dataset. For example, the expression may be a Boolean expression including a plurality of literals corresponding to the pattern to be matched.

At block 204, the processor converts the expression to a conjunctive normal form. For example, the conjunctive normal form is a conjunction of one or more clauses, where the one or more clauses are disjunctions of literals. In some examples, the processor can convert the expression to the conjunctive normal form using De Morgan's laws or distributive laws of Boolean algebra.

At block 206, the processor calculates a false positive rate (FPR) and a false negative rate (FNR) for each possible value assignment of a plurality of possible value assignments in response to detecting a missing value in the dataset. In some examples, the processor can calculate the FPR using the inclusion-exclusion principle. For example, the processor can calculate the FPR using Algorithm 1 described above with respect to FIG. 1. The processor can calculate the FNR based on a set of disjunctions generated based on the query. For example, the processor can calculate the FNR using Algorithm 2 describe above with respect to FIG. 1. In some examples, the processor can calculate the FPR and the FNR using the conjunctive normal form of the expression.

At block 208, the processor selects a value assignment from the plurality of possible value assignments based on the FPR and the FNR. In some examples, the processor can select the value assignment based on an objective function. For example, the objective function can be predefined by a user. The objective function can minimize one or more of the FPR or the FNR values. In some examples, the objective function can minimize the FNR, with the FNR smaller than some predefined value. In some examples, the processor can generate a Pareto front for the plurality of possible value assignments based on the FNRs and the FPRs of the plurality of possible value assignments. A value assignment is in the Pareto front if and only if there is no other assignment that is better in both FNR and FPR values. The processor can then select a value assignment from a subset of the possible value assignments on the Pareto front. The processor can then perform a simple exhaustive search to minimize a predefined loss function that is a combination of the FPR and the FNR.

At block 210, the processor generates a response to the query based on the selected value assignment. For example, the processor can detect one or more events of interest based on the selected value assignment. The one or more events of interest can then be included in a resulting set of matching records in the response. The processor can then transmit the response to a remote device. Then, the processor can execute an application based on the response or prevent an execution of an application, or perform any other reaction.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
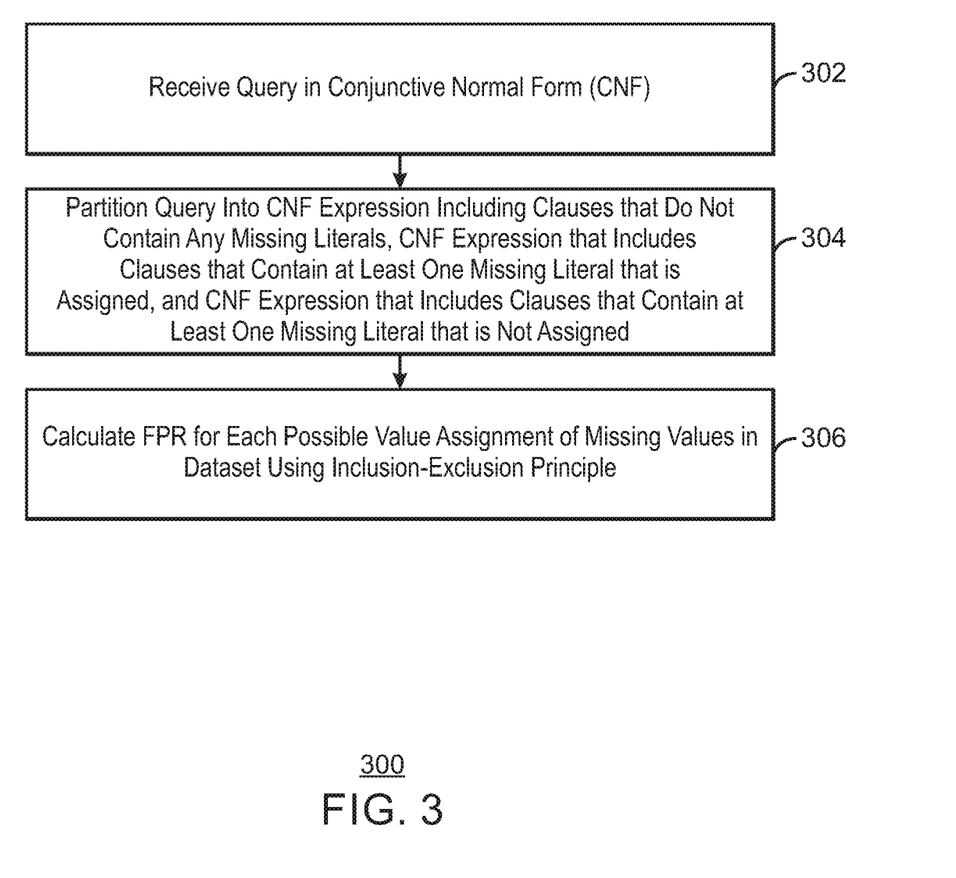
FIG. 3 is a block diagram of an example method that can calculate a false positive rate for possible value assignments of missing values.

FIG. 3 is a process flow diagram of an example method that can calculate a false positive rate for possible value assignments of missing values. The method 300 can be implemented with any suitable computing device, such as the system 100 of FIG. 1 or the computing device 500 of FIG. 5. For example, the methods described below can be implemented by the processor 502 of FIG. 5 or the processor 802 of FIG. 8 using Algorithm 1 described above.

At block 302, a processor receives a query in a conjunctive normal form. For example, the query may be received in the form of a conjunction of one or more clauses, where a clause is a disjunction of literals.

At block 304, the processor partitions the query into a CNF expression including clauses that do not contain any missing literals, a second CNF expression that includes clauses that contain at least one missing literal that is assigned, and a third CNF expression that includes clauses that contain at least one missing literal that is not assigned.

At block 306, the processor calculates a false positive rate (FPR) for each possible value assignment of the missing values in the dataset using the inclusion-exclusion principle. For example, to find the cardinality of the union of n sets, the processor can include the cardinalities of the sets, exclude the cardinalities of the pairwise intersections, include the cardinalities of the triple-wise intersections, exclude the cardinalities of the quadruple-wise intersections, include the cardinalities of the quintuple-wise intersections, and continue similarly, until the cardinality of the n-tuple-wise intersection is included (if n is odd) or excluded (if n is even).

The process flow diagram of FIG. 3 is not intended to indicate that all of the operations of the method 300 are to be included in every case. Additionally, the method 300 can include any suitable number of additional operations. For example, the processor can partition the CNF to four sets of disjunctions, and uses these sets to compute the FPR and FNR, as described in greater detail with respect to Algorithm 1 above.

Figure 4:
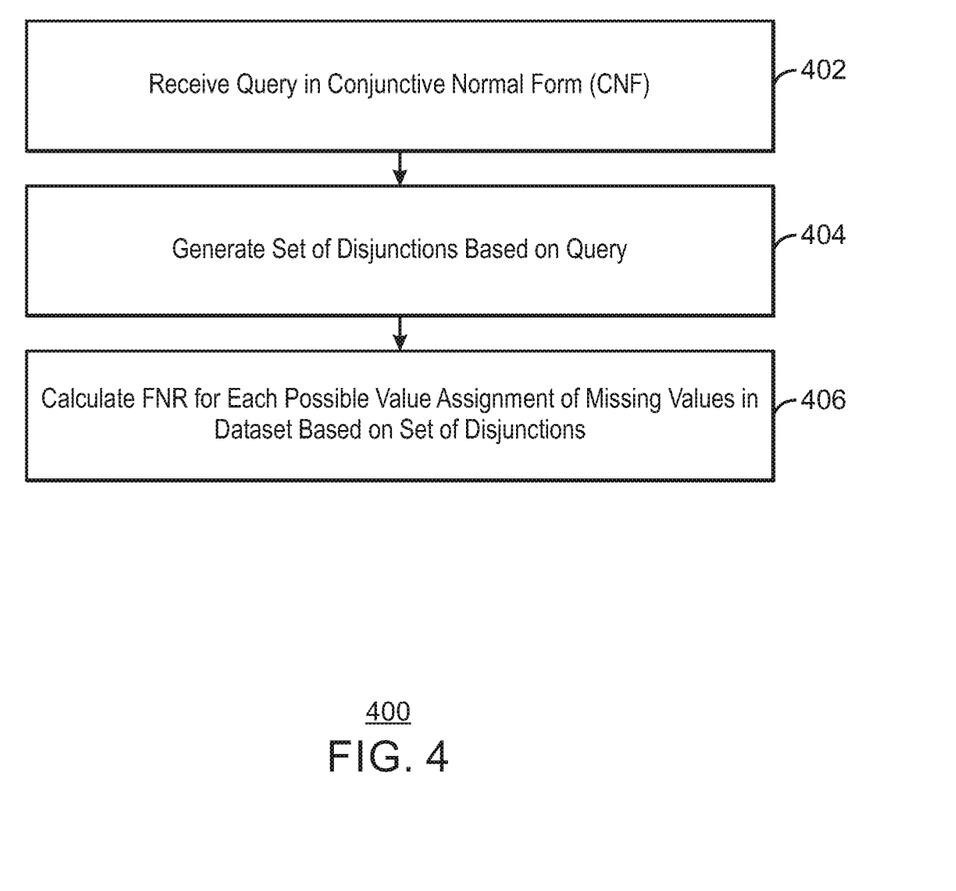
FIG. 4 is a block diagram of an example method that can calculate a false negative rate for possible value assignments of missing values.

FIG. 4 is a process flow diagram of an example method that can calculate a false negative rate for possible value assignments of missing values. The method 400 can be implemented with any suitable computing device, such as the system 100 of FIG. 1 or the computing device 500 of FIG. 5. For example, the methods described below can be implemented by the processor 502 of FIG. 5 or the processor 802 of FIG. 8 using Algorithm 2 described above.

At block 402, a processor receives a query in a conjunctive normal form. For example, the query may be received in the form of a conjunction of one or more clauses, where a clause is a disjunction of literals.

At block 404, the processor generates a set of disjunctions based on the query. For example, the processor can generate a set of disjunctions used to build the expression representing the false negatives. In case an entire clause has a false assignment, the processor can set the false negative rate to a value of 1 indicating no positive results. In some examples, the processor can compute the FNR from the original query Q using a probability function and the set of disjunctions. In particular, the processor can calculate the probability of the expression which represents the false negatives of query Q given the value assignment of the missing values. Then, the processor can divide the resulting false negative probability of the expression by the probability of the positives to generate the false negative rate.

At block 406, the processor calculates a false negative rate (FNR) for each possible value assignment of missing values in the dataset based on the set of disjunctions.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the processor can use the inclusion-exclusion principle to compute the FNR by considering the set of disjunctions, as described with respect to Algorithm 2 above.

Figure 5:
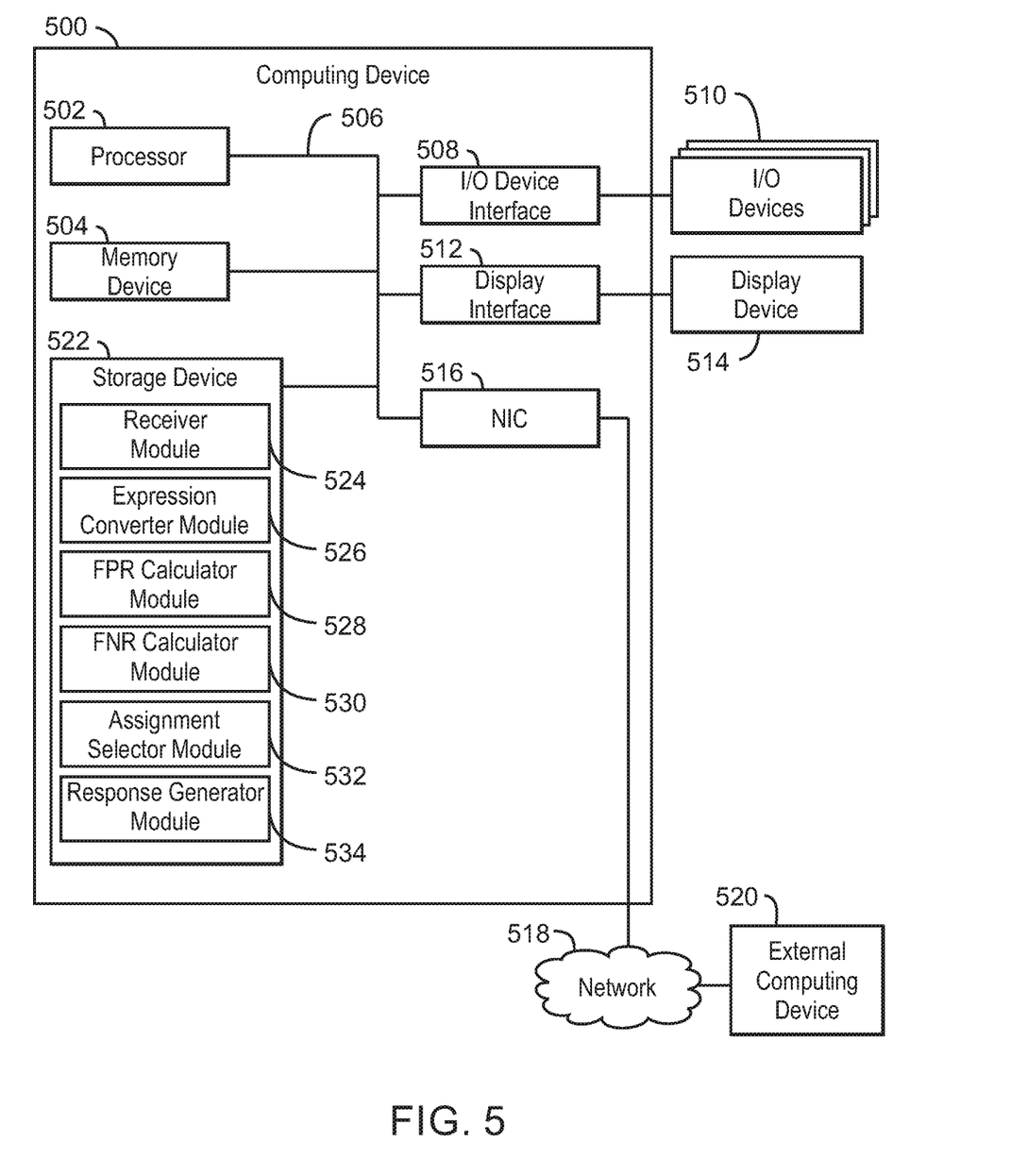
FIG. 5 is a block diagram of an example computing device that can generate responses to queries based on datasets with missing values.

FIG. 5 is block diagram of an example computing device that can generate responses to queries based on datasets with missing values. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external web-server 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, an expression converter module 526, a false positive rate (FPR) calculator module 528, a false negative rate (FNR) calculator module 530, an assignment selector module 532, and a response generator module 534. The receiver module 524 can receive a dataset and a query comprising an expression to be matched to the dataset. The expression converter module 526 can convert the expression to a conjunctive normal form. In some examples, the expression converter module 526 can convert the expression to the conjunctive normal form using De Morgan's laws or distributive laws of Boolean algebra. For example, the conjunctive normal form may be a conjunction of one or more clauses, where a clause is a disjunction of literals. The FPR calculator module 528 can calculate a false positive rate (FPR) for each possible value assignment of a plurality of possible value assignments in response to detecting a missing value in the dataset. In some examples, the FPR calculator module 528 can calculate the FPR using the conjunctive normal form of the expression. In some examples, the FPR calculator module 528 can calculate the FPR using the inclusion-exclusion principle. The FNR calculator module 530 can calculate a false negative rate (FNR) for each possible value assignment of a plurality of possible value assignments in response to detecting a missing value in the dataset. In some examples, the FNR calculator module 530 can calculate the FNR using the conjunctive normal form of the expression. In some examples, the FNR calculator module 530 can calculate the FNR based on a set of disjunctions generated based on the query. The assignment selector module 532 can select a value assignment from the plurality of possible value assignments based on the FPR and the FNR. The response generator module 534 can generate a response to the query based on the selected value assignment. In some examples, the response may include a set of one or more events of interest detected based on the selected value assignment. For example, the one or more events of interest may include a malicious event.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver module 524, the expression converter module 526, the FPR calculator module 528, the FNR calculator module 530, the assignment selector module 532, or the response generator module 534, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, the expression converter module 526, the FPR calculator module 528, the FNR calculator module 530, the assignment selector module 532, and the response generator module 534 can be implemented with logic, wherein the logic, as referred to herein, can include any suitable hardware (e.g., a processor, among others), software (e.g., an application, among others), firmware, or any suitable combination of hardware, software, and firmware.

Figure 6:
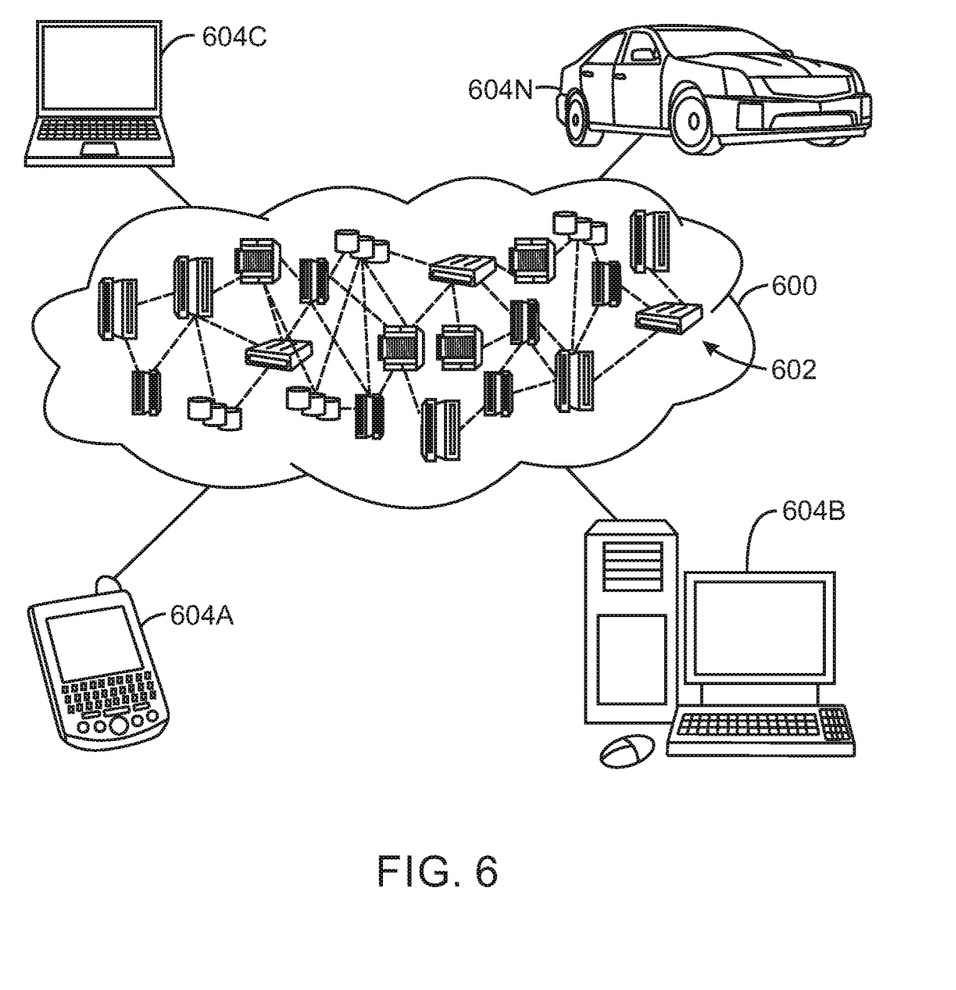
FIG. 6 is a process flow diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
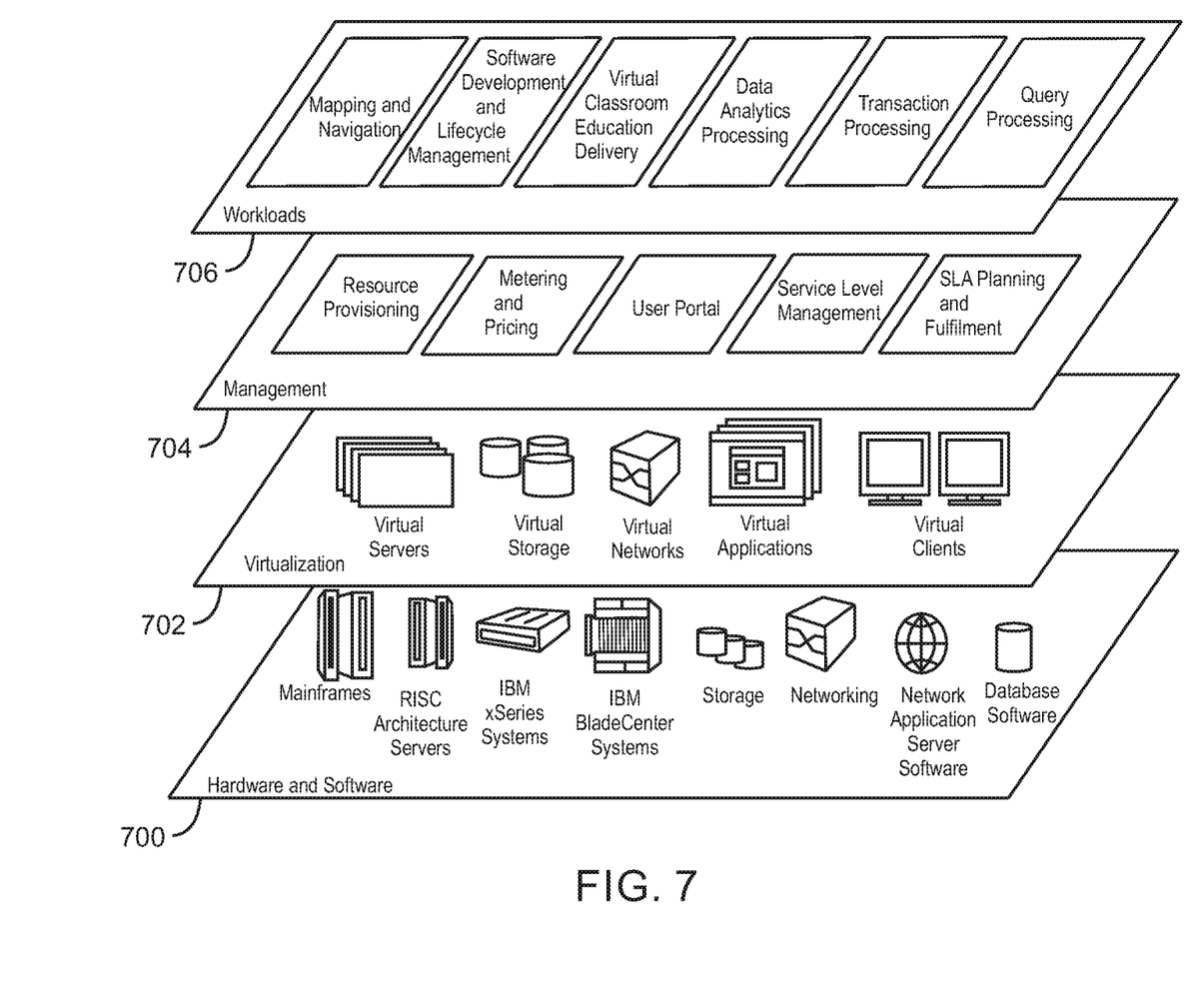
FIG. 7 is a process flow diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and query processing.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
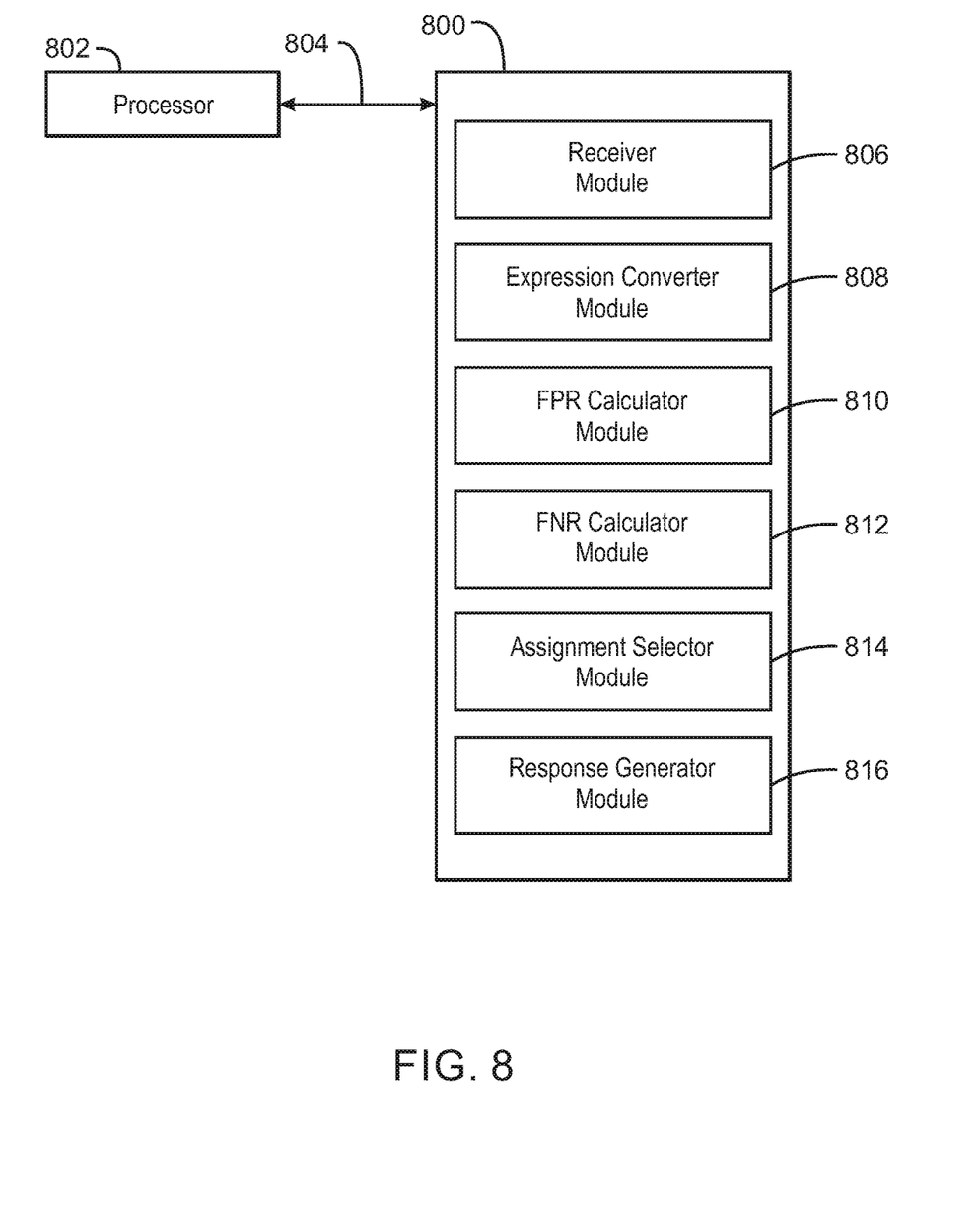
FIG. 8 is an example tangible, non-transitory computer-readable medium that can generate responses to queries based on datasets with missing values.

Referring now to FIG. 8, a block diagram is depicted of an example tangible, non-transitory computer-readable medium 800 that can generate responses to queries based on datasets with missing values. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 200, 300, and 400 of FIGS. 2-4 above.

The various software components discussed herein may be stored on the tangible, non-transitory, computer-readable medium 800, as indicated in FIG. 8. For example, a receiver module 806 includes code to receive a dataset and a query comprising an expression to be matched to the dataset. An expression converter module 808 includes code to convert the expression to a conjunctive normal form. In some examples, the expression converter module 808 can include code to convert the expression to the conjunctive normal form using De Morgan's laws or distributive laws of Boolean algebra. For example, the conjunctive normal form may be a conjunction of one or more clauses, where a clause is a disjunction of literals. A false positive rate (FPR) calculator module 810 includes code to calculate a false positive rate (FPR) for each possible value assignment of a plurality of possible value assignments in response to detecting a missing value in the dataset. The FPR calculator module 810 also includes code to calculate the FPR using the conjunctive normal form of the expression. In some examples, the FPR calculator module 810 can include code to calculate the FPR using the inclusion-exclusion principle. A false negative rate (FNR) calculator module 812 includes code to calculate a false negative rate (FNR) for each possible value assignment of a plurality of possible value assignments in response to detecting a missing value in the dataset. The FNR calculator module 812 also includes code to calculate the FNR using the conjunctive normal form of the expression. In some examples, the FNR calculator module 812 can include code to calculate the FNR by generating a set of disjunctions based on the query. An assignment selector module 814 includes code to select a value assignment from the plurality of possible value assignments based on the FPR and the FNR. In some examples, the assignment selector module 814 can include code to generate a Pareto front for the plurality of possible value assignments based on the FNRs and the FPRs of the plurality of possible value assignments and select the value assignment from a subset of the possible value assignments on the Pareto front. In some examples, the assignment selector module 814 can include code to perform a simple exhaustive search to minimize a predefined loss function that is a combination of the FPR and the FNR. A response generator module 816 includes code to generate a response to the query based on the selected value assignment. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a dataset and a query comprising an expression to be matched to the dataset;
calculate a false positive rate (FPR) and a false negative rate (FNR) for each possible value assignment of a plurality of possible value assignments in response to detecting a missing value in the dataset;
select a value assignment from the plurality of possible value assignments based on the FPR and the FNR, wherein the processor is to generate a Pareto front for the plurality of possible value assignments based on the FNRs and the FPRs of the plurality of possible value assignments and select the value assignment from a subset of the possible value assignments on the Pareto front; and
generate a response to the query based on the selected value assignment.

2. The system of claim 1, wherein the processor is to convert the expression to conjunctive normal form and calculate the FPR and the FNR using the conjunctive normal form of the expression.

3. The system of claim 1, wherein the processor is to calculate the FPR or the FNR using an inclusion-exclusion principle.

4. The system of claim 1, wherein the processor is to calculate the FPR or the FNR based on a set of disjunctions generated based on the query.

5. The system of claim 1, wherein the response comprises a set of events of interest detected based on the selected value assignment.

6. The system of claim 5, wherein the set of events of interest comprises a malicious event.

7. The system of claim 1, wherein the processor is to convert the expression to a normalized form.

8. A computer-implemented method, comprising:
receiving, via a processor, a dataset and a query comprising an expression to be matched to the dataset;
calculating, via the processor, a false positive rate (FPR) and a false negative rate (FNR) for each possible value assignment of a plurality of possible value assignments in response to detecting a missing value in the dataset;
selecting, via the processor, a value assignment from the plurality of possible value assignments based on the FPR and the FNR, wherein selecting the value assignment comprises generating a Pareto front for the plurality of possible value assignments based on the FNRs and the FPRs of the plurality of possible value assignments, and selecting the value assignment from a subset of the possible value assignments on the Pareto front; and
generating, via the processor, a response to the query based on the selected value assignment.

9. The computer-implemented method of claim 8, comprising converting the expression to a conjunctive normal form and calculating the FPR and the FNR using the conjunctive normal form of the expression.

10. The computer-implemented method of claim 8, wherein calculating the FPR comprises using an inclusion-exclusion principle.

11. The computer-implemented method of claim 8, wherein calculating the FNR comprises generating a set of disjunctions based on the query.

12. The computer-implemented method of claim 8, wherein selecting the value assignment comprises performing a simple exhaustive search to minimize a predefined loss function that comprises a combination of the FPR and the FNR.

13. The computer-implemented method of claim 8, wherein generating the response comprises detecting an event of interest based on the selected value assignment.

14. A computer program product comprising a computer-readable storage medium having program code embodied therewith, wherein the computer readable storage medium is not a transitory signal per se, the program code executable by a processor to cause the processor to:
receive a dataset and a query comprising an expression to be matched to the dataset;
calculate a false positive rate (FPR) and a false negative rate (FNR) for each possible value assignment of a plurality of possible value assignments in response to detecting a missing value in the dataset;
select a value assignment from the plurality of possible value assignments based on the FPR and the FNR, wherein the processor is to generate a Pareto front for the plurality of possible value assignments based on the FNRs and the FPRs of the plurality of possible value assignments and select the value assignment from a subset of the possible value assignments on the Pareto front; and
generate a response to the query based on the selected value assignment.

15. The computer program product of claim 14, further comprising program code executable by the processor to convert the expression to a conjunctive normal form and calculate the FPR and the FNR using the conjunctive normal form of the expression.

16. The computer program product of claim 14, further comprising program code executable by the processor to calculate the FPR or the FNR using an inclusion-exclusion principle.

17. The computer program product of claim 14, further comprising program code executable by the processor to calculate the FPR or the FNR by generating a set of disjunctions based on the query.

18. The computer program product of claim 14, further comprising program code executable by the processor to perform a simple exhaustive search to minimize a predefined loss function that is a combination of the FPR and the FNR.

* * * * *